United States Patent [19]
Uchihara et al.

[11] Patent Number: 5,818,713
[45] Date of Patent: Oct. 6, 1998

[54] PLANT SUPPORT SYSTEM

[75] Inventors: Shoichi Uchihara; Michihiro Ishii, both of Hyogo-ken, Japan

[73] Assignee: Mitsubishi Denki Kabushiki Kaisha, Tokyo, Japan

[21] Appl. No.: 505,818

[22] Filed: Jul. 21, 1995

[30]       Foreign Application Priority Data

Jul. 29, 1994 [JP] Japan .................................. 6-174550

[51] Int. Cl.⁶ .................................................. G05B 9/02
[52] U.S. Cl. ........................ 364/184; 364/183; 364/200
[58] Field of Search .................. 364/184, 183, 364/200, 513, 150; 395/575, 52, 62, 715; 371/9

[56]               References Cited

U.S. PATENT DOCUMENTS

| | | | |
|---|---|---|---|
| 4,570,222 | 2/1986 | Oguchi | 364/200 |
| 4,740,887 | 4/1988 | Rutengerg | 364/184 |
| 4,755,925 | 7/1988 | Tsuchiya et al. | 364/150 |
| 4,815,014 | 3/1989 | Lipner et al. | 364/550 |
| 4,819,232 | 4/1989 | Krings | 371/9 |
| 4,903,194 | 2/1990 | Houdek et al. | 364/200 |
| 4,920,499 | 4/1990 | Skeirik | 364/513 |
| 4,967,337 | 10/1990 | English et al. | 364/184 |
| 4,975,865 | 12/1990 | Carrette et al. | 364/513 |
| 4,976,780 | 12/1990 | Amano et al. | 75/375 |
| 4,992,928 | 2/1991 | Ishihara et al. | 364/183 |
| 5,023,045 | 6/1991 | Watanabe et al. | 376/215 |
| 5,058,113 | 10/1991 | Burnham et al. | 371/15.1 |
| 5,077,663 | 12/1991 | Kanazawa | 395/775 |
| 5,099,412 | 3/1992 | Kelley | 364/148 |
| 5,101,337 | 3/1992 | Ebizuka | 364/184 |
| 5,193,177 | 3/1993 | Burri | 395/575 |
| 5,195,029 | 3/1993 | Murai | 364/184 |
| 5,214,577 | 5/1993 | Sztipanovits et al. | 364/184 |
| 5,280,606 | 1/1994 | Jippo et al. | 395/575 |
| 5,293,585 | 3/1994 | Morita | 395/52 |
| 5,315,502 | 5/1994 | Koyama et al. | 364/184 |
| 5,367,670 | 11/1994 | Ward et al. | 395/575 |
| 5,395,701 | 3/1995 | Fukui et al. | 395/62 |
| 5,446,851 | 8/1995 | Yamaguchi | 395/375 |

*Primary Examiner*—Reba I. Elmore
*Assistant Examiner*—McDieunel Marc
*Attorney, Agent, or Firm*—Rothwell, Figg, Ernst & Kurz

[57]               ABSTRACT

A hierarchical knowledge base system is provided to enhance the efficiencies of constructing knowledge bases, making inferences, and understanding and analyzing the contents and state of a fault in a plant. Hierarchical knowledge bases store plant information on the states of plant equipment, media flowing through the plant, control instructions, and a plant system diagram. This information is used to make inferences for the detection of a fault in the plant, the identification of faulty equipment, and the cause of the fault, in stages from an upper layer to a lower layer, and the results of the inferences are displayed. The hierarchical knowledge base is constructed by synthesizing a knowledge base of an upper layer from a knowledge base of a lower layer.

8 Claims, 13 Drawing Sheets

PLANT SUPPORT SYSTEM

BACKGROUND OF THE INVENTION

1. Field of the Invention

This invention relates to a system for supporting the working and operation of a plant when a fault occurs in the plant.

2. Description of the Prior Art

A plant support system has knowledge bases which utilize a plant system diagram and an inference mechanism and collects and processes process data of a plant of interest on an on-line, real-time basis in order to execute various support functions. For instance, for application in a power plant, the system displays a plant system diagram consisting of symbols (graphic codes) indicative of each equipment in the plant and connection lines indicative of pipings and wiring connecting the equipment, receives input data such as the states of each equipment, media running through the plant and control instructions on an on-line, real-time basis, and uses the data and the knowledge bases divided for each inference purpose to make inferences for the detection of a fault in the plant and the identification of a faulty equipment and the cause of the fault in order to support the working and operation of the plant when a fault occurs.

FIG. 12 is a structural diagram of a prior art plant support system. FIG. 13 is a flow chart showing the inference processing of the prior art.

In FIG. 12, reference numeral 1 represents a process input/output unit for collecting and processing on-line input value data from the plant, 2 a data processing unit for processing the data from the process input/output unit 1 into a format required for a computer, and 3 an inference processing interface unit for processing the data from the data processing unit 2 into a format required for inference processing for each sampling.

Numeral 4 denotes an inference unit which comprises a fault detection unit 4a, a faulty equipment identifying unit 4b, a cause identifying unit 4c, and a counter-operation deduction unit 4d. The fault detection unit 4a always monitors plant information which is supplied from the inference processing interface unit 3 upon each sampling. When the fault detection unit 4a detects a fault in the plant, the faulty equipment identifying unit 4b identifies which equipment of the plant becomes faulty, the cause identifying unit 4c identifies the cause of the fault by sorting out possible causes within the equipment identified as faulty, and the counter-operation deduction unit 4d deduces a counter-operation to counter the identified cause.

Reference numeral 5 represents an inference result processing unit for processing the output of the results of inferences made by the inference unit 4, 6 a graphics processing unit for producing graphic images from data from the inference result processing unit 5 and the data processing unit 2 and processing the graphic images, and 7 a man-machine interface unit for controlling the graphics processing unit 6 and an operation unit 14.

Reference numeral 8 represents a knowledge base required for the inference unit 4 to make inferences, which consists of a fault detection knowledge base 8a required for the fault detection unit 4a to make an inference, and a knowledge base 8c containing information data 8b on each equipment required for the faulty equipment identifying unit 4b, the cause identifying unit 4c and the counter-operation deduction unit 4d to make inferences, and drawing data on the system diagram.

Numeral 12 denotes an inference record file for storing a record of the results of inferences made by the inference unit 4, 14 an operation unit for managing operation instructions supplied through the man-machine interface unit 7 and the graphics processing unit 6 and for supplying processing instructions to each processing unit, 19 a CRT unit which is part of an output device, 19a a graphic system diagram to be output to the CRT unit 19, and 19b an inference result output diagram to be output to the CRT unit 19 of the input/output device.

A description is subsequently given of the operation of the prior art plant support system referring to FIG. 12 and FIG. 13. When process data of sampling n processed for inference by means of the process input/output unit 1, the data processing unit 2 and the inference processing interface 3 is input and inference processing starts, the processing of a fault detection inference is performed by the fault detection unit 4a (step 601). In this processing of the fault detection inference, input data from the inference processing interface 3 are compared with data on the states of the plant stored in the fault detection knowledge base 8a to infer whether a fault occurs in the plant. Then if no fault occurs, inference on n-th sampling data is over, and the step moves to the processing of inference on n+1-th sampling data (NO in step 602, step 609). If a fault occurs, the fault detection unit 4a supplies the name of the fault (the name of a fault phenomenon) and other data through the inference result processing unit 5 to the graphics processing unit 6 which in turn produces image data from the supplied data and sends the data to the CRT unit 19 through the man-machine interface unit 7. The CRT unit 19 displays the data including the name of the fault (YES in step 602, step 603).

Thereafter, the faulty equipment identifying unit 4b performs the processing of an inference for the identification of a faulty equipment (step 604). In this processing, an equipment generating data relating to the occurrence of the fault is searched for and a description of the normal state of the equipment stored in the knowledge base 8c of the equipment is compared with data input from the inference processing interface 3 to infer whether the searched equipment is in normal operation. If the equipment is in normal operation, the inference for the identification of a faulty equipment is continued to be made on connection equipment having causal relation with the equipment, such as wiring.

Then the step proceeds to an inference for the identification of the cause by the cause identifying unit 4c (step 605). In this processing, the knowledge base 8c of the equipment which has been identified as faulty is compared with input data from the inference processing interface 3, a description of the same contents as the input data is retrieved from the knowledge base 8c, and the branching of the retrieval tree is repeated to infer the written cause in the end. The final inference result is supplied through the inference result processing unit 5 to the graphics processing unit 6 which in turn produces image data from the data from the graphics processing unit 6 and supplies the image data to the CRT unit 19 through the man-machine interface 7. The CRT unit 19 displays the cause of the fault on the screen (step 606).

The step proceeds further to an inference for the deduction of a counter-operation guidance by the counter-operation deduction unit 4d (step 607). In this processing, the counter-operation deduction unit 4d retrieves a description of the same name as the name of the identified cause from the knowledge base 8c of the equipment and deduces a description of a counter-operation to be taken against the cause. The counter-operation guidance is supplied to the inference result processing unit 5, and the graphics processing unit 6 produces image data from the supplied counter-operation guidance and supplies the data to the CRT unit 19 through the man-machine interface 7. The CRT unit 19 displays the operation to counter the fault (step 608).

The plant support system of the prior art described above is arranged such that the knowledge base 8c contains files which merely store a certain range of unclassified information. Therefore, if a plant of interest is large in scale, the volume of the knowledge base 8c becomes huge. To construct such a knowledge base 8c, the elements of the system diagram must be related with information on the characteristics and operation conditions of the elements with reference to the system diagram of a plant of interest to proceed with the construction of the knowledge base 8c. Therefore, the prior art involves the problem that it requires a huge amount of time and labor with the result of a great load on a person in charge of the construction of a knowledge base.

When an inference is executed using a huge volume of knowledge base 8c, the processing efficiency of the process from the identification of the cause to the deduction of the counter-operation guidance is low, time required for the execution of inferences increases, and the processing of recovery from the fault is delayed.

Information to be displayed by the plant support system includes the results of inferences and other related data, but the process of inference and the knowledge base 8c used are hard for an operator to understand. Therefore, the prior art involves another problem that the reliability of the information is too low for an operator to check and analyze the state of a fault when it occurs because of the above reason and others.

SUMMARY OF THE INVENTION

This invention has been made to solve the above-described problems, and a first object of the invention is to enhance the efficiency of constructing knowledge bases and the efficiency of executing inferences by hierarchizing knowledge bases and inference processing, respectively.

A second object of the invention is to understand the contents of a fault when it occurs and to present high-quality information which facilitates the analysis of the state of the fault and handling of the fault by controlling and managing information used in the execution of inferences.

The plant support system according to a first aspect of the invention comprises multi-layered hierarchical knowledge bases which maintain the relationship between upper and lower layers as knowledge bases for identifying a faulty equipment.

The plant support system according to a second aspect of the invention is arranged such that an inference for the identification of a faulty equipment starts from the knowledge bases of upper layers.

The plant support system according to a third aspect of the invention is arranged such that the process of narrowing down a range of equipment identified as faulty in stages is displayed over a system diagram depicted on a display device such as a CRT unit by changing colors or flickering on a real-time basis.

The plant support system according to a fourth aspect of the invention is arranged such that knowledge bases of upper layers are created from the knowledge base of the lowest layer to construct hierarchical knowledge bases.

The plant support system according to a fifth aspect of the invention is arranged such that multi-layered knowledge bases created and produced are output as the results of inferences when a fault occurs.

The plant support system according to a sixth aspect of the invention is arranged such that process data and the trends of process data are displayed on the screen when a fault occurs.

The plant support system according to a seventh aspect of the invention is arranged such that recursive processing is made on past data obtained when faults occurred, and the processed data is used to repeat inference.

The plant support system according to an eighth aspect of the invention is arranged such that a knowledge base applied in inference as the result of inference and data before and after the occurrence of a fault included in process data used in the knowledge base are selected, related with each other, and displayed in the case of displaying the result of inference.

The plant support system according to a ninth aspect of the invention is arranged such that a knowledge base applied in inference as a record of inferences made when faults occurred in the past and process data used in the knowledge base are selected, related with each other, and displayed.

The plant support system according to the first aspect of the invention is characterized in that the hierarchical knowledge base makes it possible to reduce the number of knowledge bases applied in the execution of an inference as well as time required to execute an inference.

The plant support system according to the second aspect of the invention makes an inference from information of upper layers of the hierarchical knowledge bases to information of the lowest layer.

The plant support system according to the third aspect of the invention displays graphically the process of inference in each stage and the result of inference on an output device such as a CRT unit in a comprehensive manner by means of changing colors or flickering when an inference is made on the hierarchical knowledge base from information of upper layers to information of the lowest layer.

The plant support system according to the fourth aspect of the invention constructs hierarchical knowledge bases sequentially from the knowledge base of the lowest layer to knowledge bases of upper layers.

The plant support system according to the fifth aspect of the invention presents comprehensive hierarchical knowledge bases by displaying created knowledge bases of upper layers as the result of inference.

The plant support system according to the sixth aspect of the invention records and stores process data continuously and displays the trends of the stored process recorded data.

The plant support system according to the seventh aspect of the invention makes a recursive processing on past plant process data stored as process recorded data for re-use in inference.

The plant support system according to the eighth aspect of the invention relates information used in inference with process data for output on a display device.

The plant support system according to the ninth aspect of the invention relates information used in inference as the result of inference when a fault occurred in the past with process data for output on a display device.

The above and other objects, features and advantages of the invention will become more apparent from the following description when taken into conjunction with the accompanying drawings.

DESCRIPTION OF THE PREFERRED EMBODIMENT

Embodiments 1 to 8 of the invention will be described hereinunder with reference to FIG. 1 to FIG. 11 in which the same components as those of the prior art are given the same reference codes.

Embodiment 1

Figure 1:
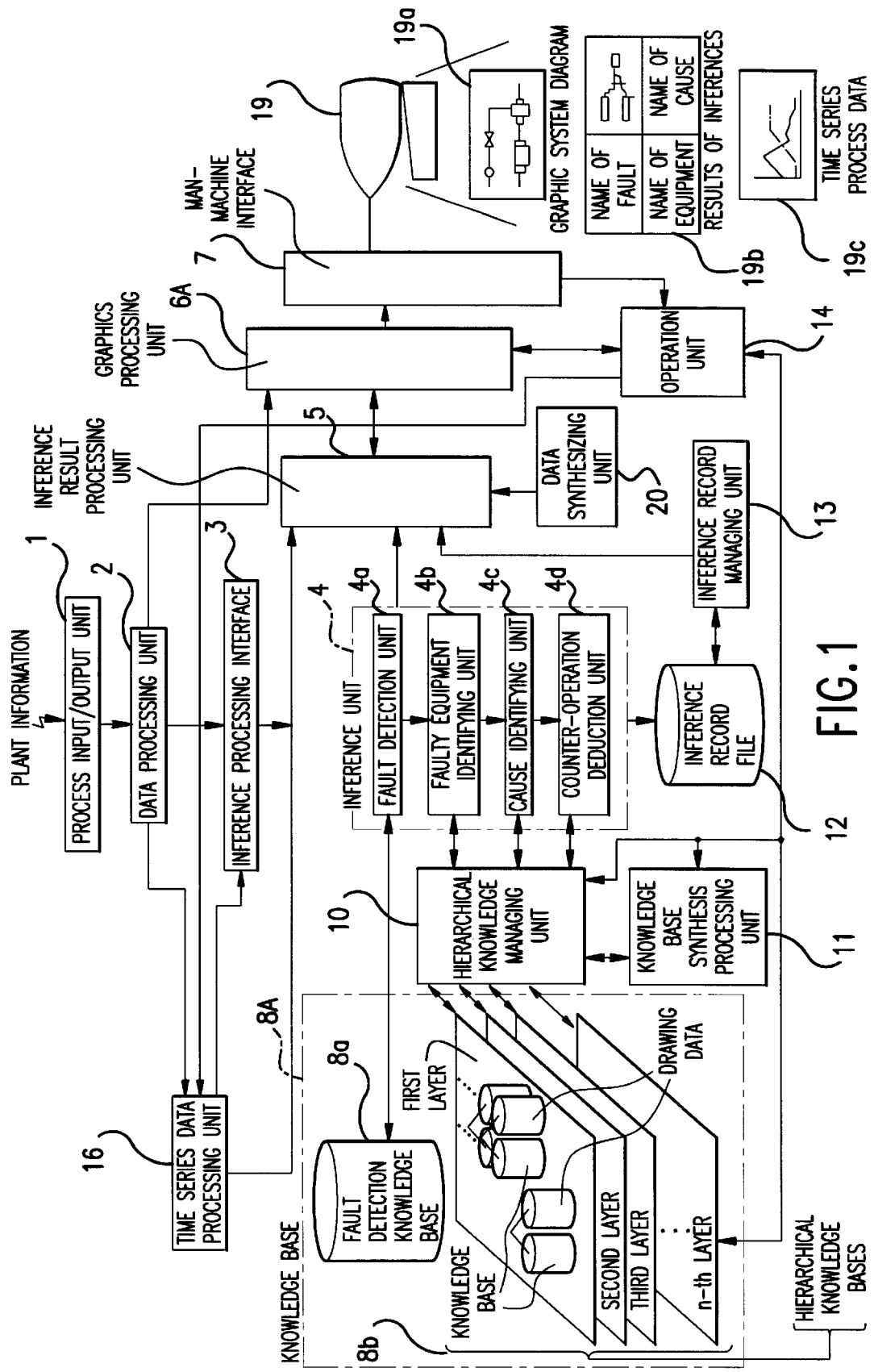
FIG. 1 is a structural diagram of a plant support system according to Embodiment 1 of the invention.
Figure 2:
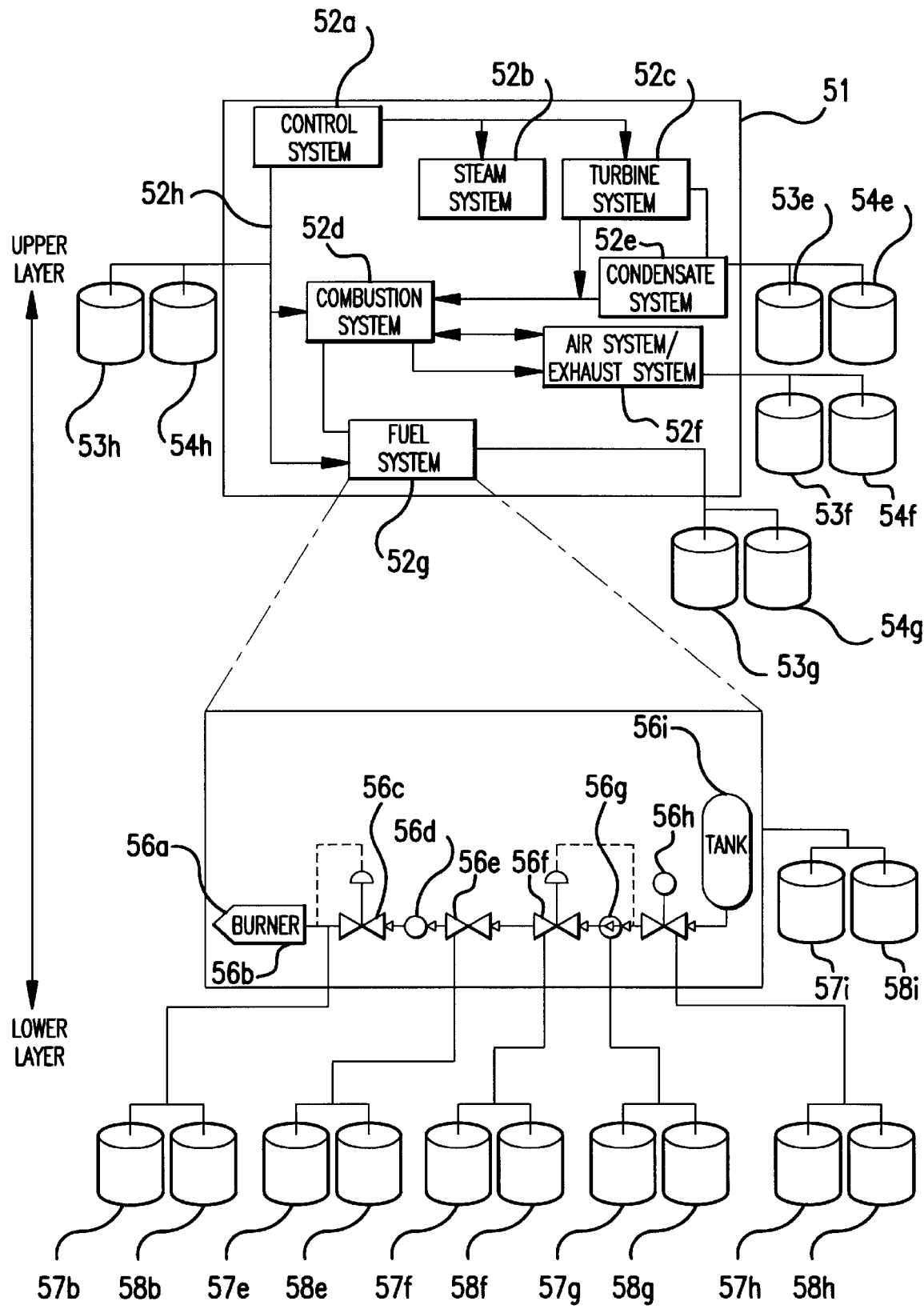
FIG. 2 is a diagram showing the concept of the hierarchical knowledge bases of Embodiment 1 of the invention.
Figure 3:
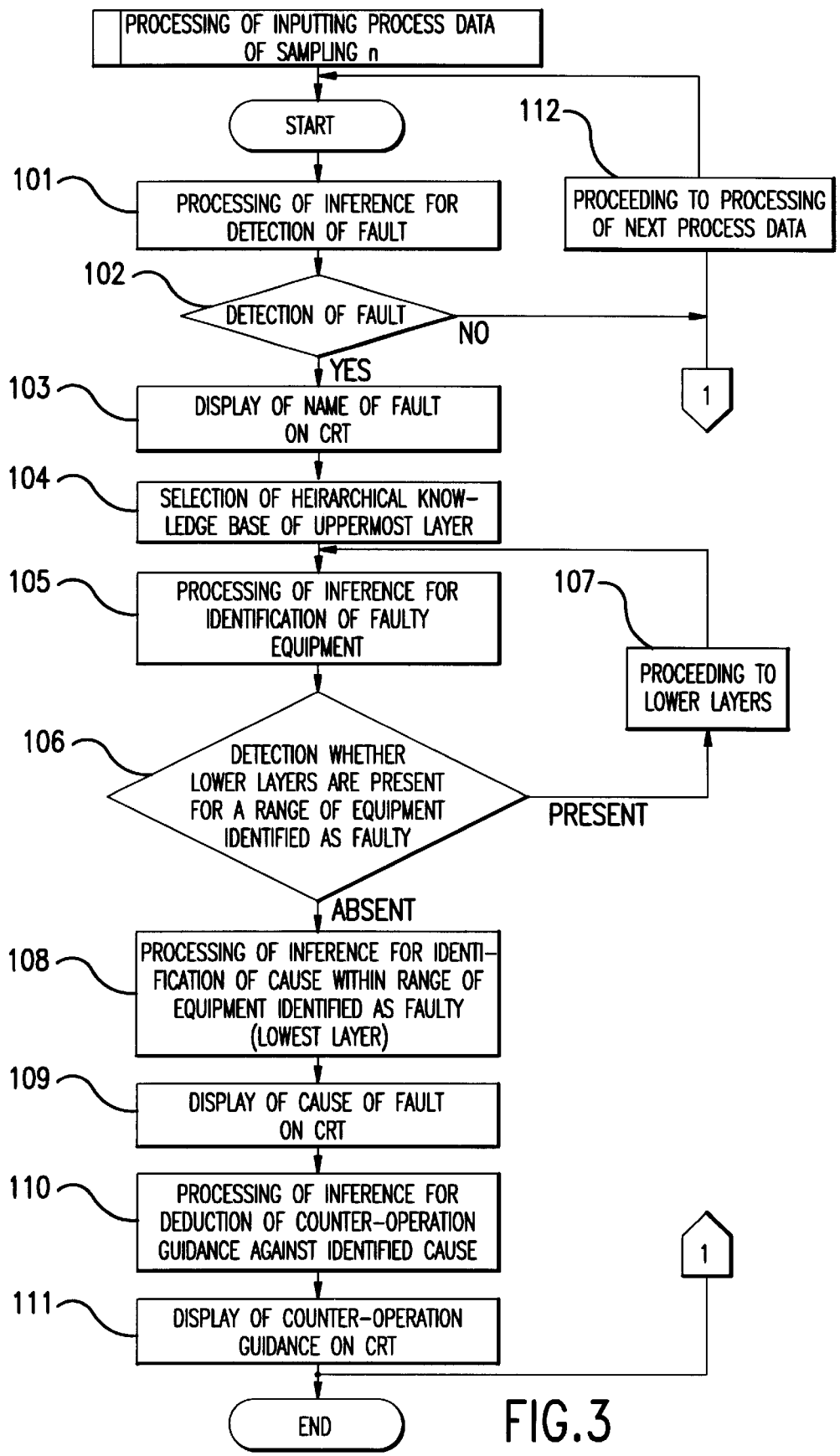
FIG. 3 is a flow chart of Embodiment 1 of the invention.

FIG. 1 is a structural diagram of a plant support system according to Embodiment 1 of the invention, FIG. 2 is a diagram showing the concept of the hierarchical knowledge bases of Embodiment 1, and FIG. 3 is a flow chart showing the inference processing of Embodiment 1.

In FIG. 1, the plant support system of Embodiment 1 comprises, roughly speaking, a graphics processing unit 6A, a knowledge base 8A, hierarchical information managing unit 10, a knowledge base synthesis processing unit 11, a time series data processing unit 16 and a data synthesizing unit 20, in addition to the same process input/output unit 1, data processing unit 2, inference processing interface unit 3, inference unit 4, inference result processing unit 5, man-machine interface unit 7, inference record file 12, operation unit 14 and CRT unit 19 as the prior art.

The inference unit 4 comprises a fault detection unit 4a, a faulty equipment identifying unit 4b, a cause identifying unit 4c, and a counter-operation deduction unit 4d like the prior art.

The graphics processing unit 6A produces a graphic image from data from the inference result processing unit 5 and the data processing unit 2, and outputs to the CRT unit 19 the process of inference in which a range of elements identified as faulty by a faulty equipment identification inference is narrowed down in stages from upper to lower layers by means of zooming in, changing the color of, or flickering the range.

Figure 12:
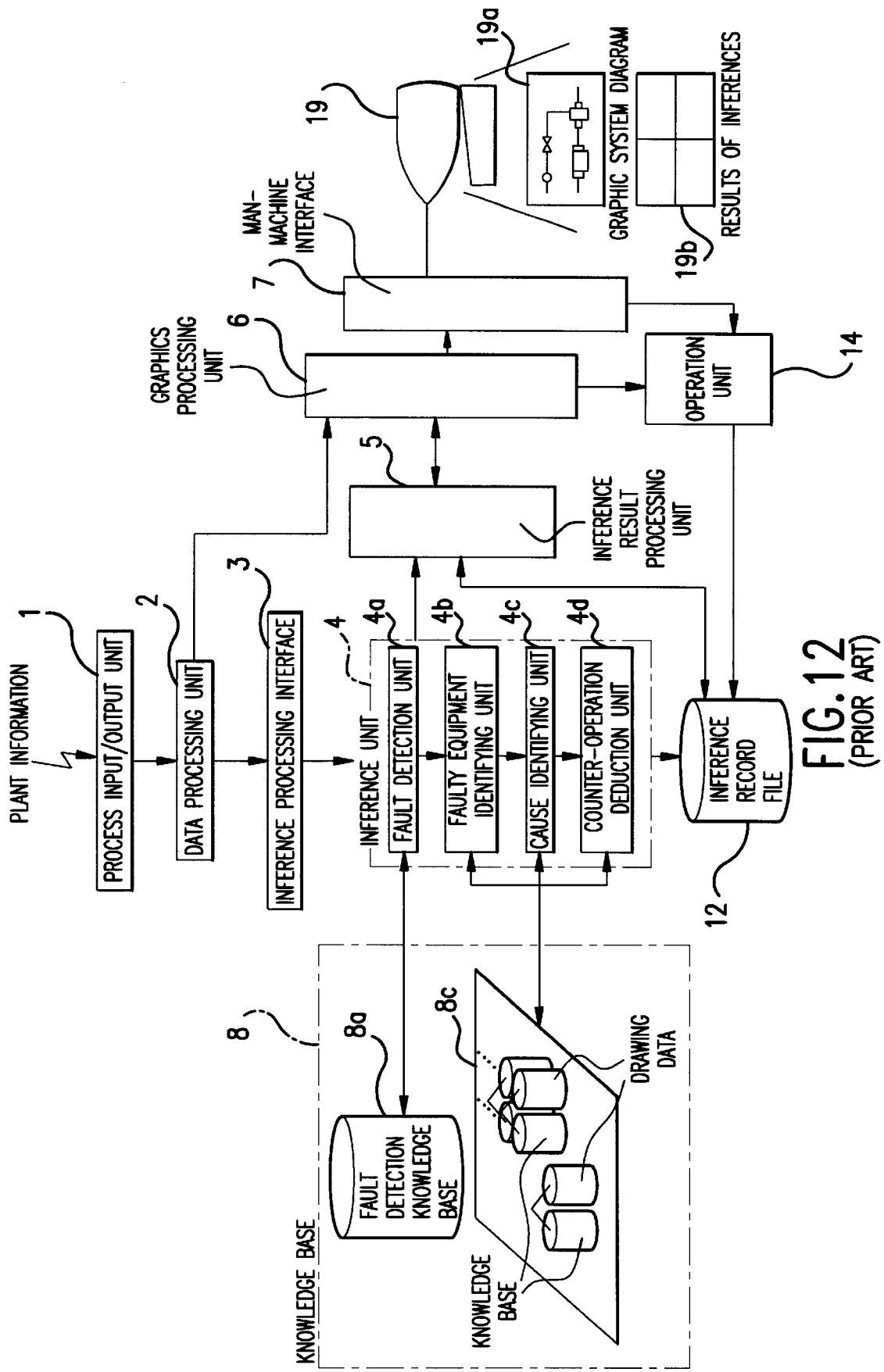
FIG. 12 is a structural diagram of a prior art plant support system.
Figure 13:
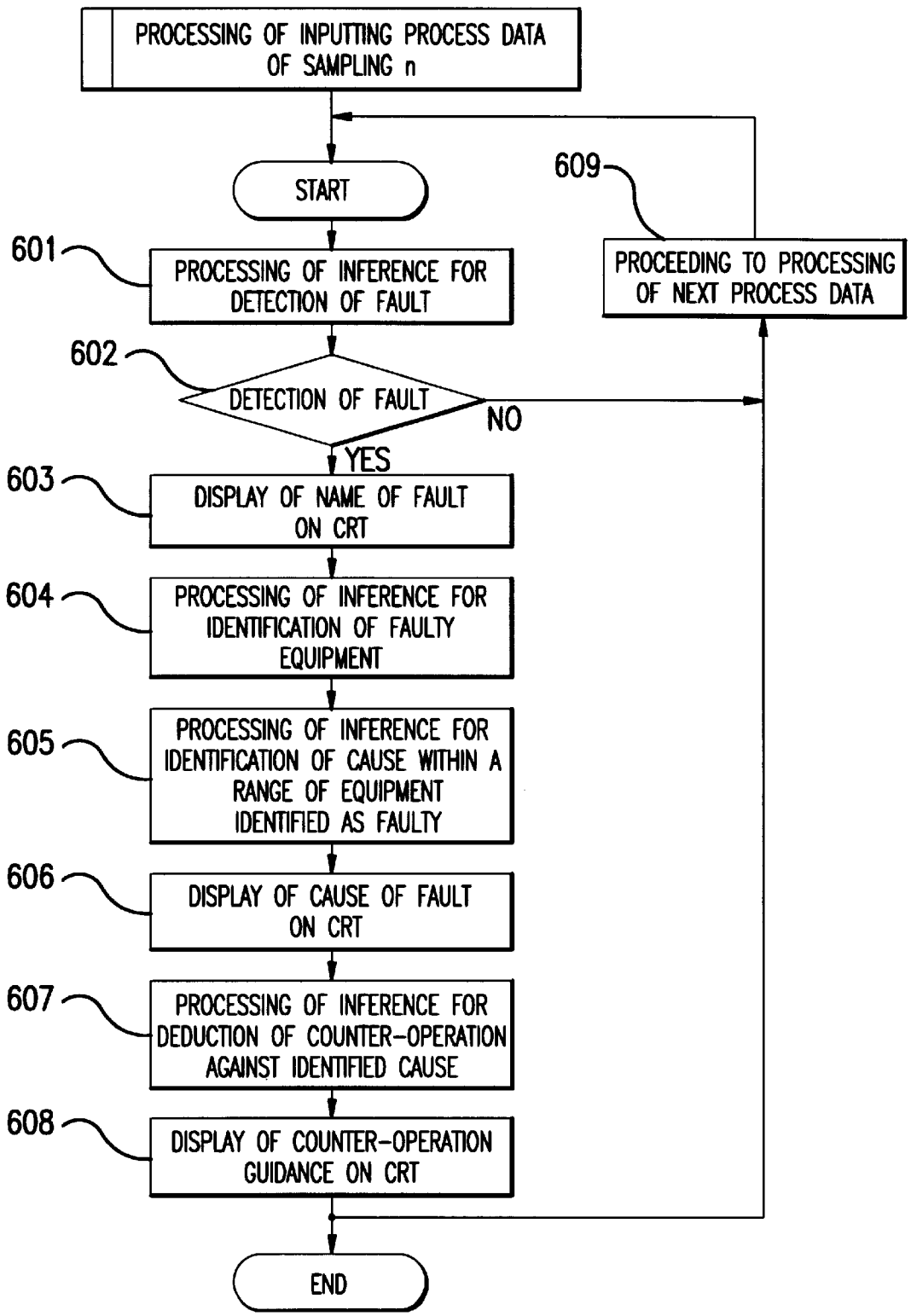
FIG. 13 is a flow chart of the prior art.

The knowledge base 8A consists of a fault detection knowledge base 8a and hierarchical knowledge bases 8b. In the hierarchical knowledge bases 8b, as files are divided into a plurality of layers for management, some layers of files are created under the standard layer and storing layers are different depending on the contents and applications of files. As shown in FIG. 2, the hierarchical knowledge bases 8b are of a tree-like hierarchical structure, for example. Therefore, these hierarchical knowledge bases 8b are different in structure from the knowledge base 8c of the prior art shown in FIG. 12, which has files storing a certain range of unclassified information.

The hierarchical knowledge management unit 10 controls the hierarchical knowledge bases 8b, performs inter-layer management and processing, and manages and processes information between the hierarchical knowledge bases 8b and the inference unit 4. The term "inter-layer management" by the hierarchical knowledge management unit 10 used herein refers to the management of the relationship between equipment of upper layers and equipment of lower layers through the management of information indicative of the relationship between upper and lower layers. For instance, in the example of FIG. 2, information indicating that equipment 56a to 56i are included in the lower layer 55 of the fuel system 52g of the upper layer 51 is stored in the hierarchical knowledge management unit 10 which manages the stored information. The term "inter-layer processing" by the hierarchical knowledge management unit 10 used herein refers to the retrieval of equipment information by searching upper and lower layers using the information indicating the relationship between layers. The term "management and processing of information between the hierarchical knowledge bases 8b and the inference unit 4" by the hierarchical knowledge management unit 10 used herein refers to the extraction of equipment information required according to the stage of inference, for example, information on equipment potential to be faulty and inference needed to be made thereon, from the hierarchical knowledge bases 8b, by managing and using the relationships among a plurality of equipment, for example, one equipment being connected to another equipment in a certain layer, and to the supply of the extracted information to the inference unit 4.

When the knowledge base synthesis processing unit 11 receives an instruction from the operation unit 14, the unit operates the information of the hierarchical knowledge bases 8b, creates (synthesizes) information for an upper layer, and processes inter-layer operation. The creation of information for an upper layer by operating the information of the hierarchical knowledge bases 8b by the knowledge base synthesis processing unit 11 relates to the synthesis of the hierarchical knowledge bases 8b in Embodiment 3 to be described later and illustrated in FIG. 5. This means that knowledge bases for a range of equipment to be synthesized are selected by judging the connection relationships among equipment from drawing data on the equipment of a certain layer so as to synthesize a knowledge base for the range of equipment. The term "the processing of inter-layer operation by operating the information of the hierarchical knowledge bases 8b" by the knowledge base synthesis processing unit 11 used herein refers to the processing of writing information indicating the parent-child relationship between the equipment of lower layers and the equipment of a synthesized upper layer on drawing data for each equipment. Use of the information indicating this parent-child relationship makes possible inter-layer search, for example, shift to the equipment of an upper layer to be searched or shift to the equipment of a lower layer to be searched, as well as the processing of the hierarchical information management unit 10.

The inference record management unit 13 manages information stored in the inference record file 12, retrieves a required inference record according to an operation instruction from the operation unit 14, and outputs the result of retrieval to the inference result processing unit 5.

The time series data processing unit 16 stores data processed by the data processing unit 2 as process data in the time series order.

The CRT unit 19 displays time series process data 19c in addition to a graphic system diagram 19a and an inference result diagram 19b.

The data synthesizing unit 20 integrates information from the inference unit 4 and the time series data processing unit 16 and information from the inference record management unit 13 to judge data relating to the occurrence of a fault from all aspects and to output the data.

A description is subsequently given of the concept of the above-described hierarchical knowledge bases 8b with reference to FIG. 2. FIG. 2 shows an example of a thermal power plant. Reference numerals 51 and 55 represent a plurality of inference layers: 51 is an upper layer and 55 a lower layer. The upper and lower layers 51 and 55 are basically the same as the hierarchical knowledge bases 8b shown in FIG. 1, but FIG. 1 shows the location of the knowledge base in the plant support system, whereas FIG. 2 shows the relationships among data stored in the knowledge base including the operation and processing of the hierarchical knowledge management unit 10.

In other words, the upper and lower layers 51 and 55 are layers composed of a group of systems and equipment, respectively, constituting a plant to be supported by the plant support system.

The upper layer 51 is a layer composed of a group of systems only in the plant of interest. This layer 51 has such elements as a control system 52a, a steam system 52b, a turbine system 52c, a condensate system 52e, an air system/exhaust system 52f, a combustion system 52d, a fuel system 52g, and connection lines 52h indicating pipings for connecting these elements or signal flows. In this upper layer 51, drawing data files 53e to 53h required to form respective graphic images and knowledge base files 54e to 54h which store inference information for each element are provided separately for the condensate system 52e, the air system/exhaust system 52f, the fuel system 52g and the connection lines 52h, respectively.

The lower layer 55 is provided for each element such as the control system 52a, the steam system 52b, the turbine system 52c, the condensate system 52e, the air system/exhaust system 52f, the combustion system 52d, the fuel system 52g and the connection lines 52h within the upper layer 51. In FIG. 2, the lower layer 55 for the fuel system 52g within the upper layer 51 is illustrated as an example. That is, the lower layer 55 illustrated in FIG. 2 has equipment constituting the fuel system 52g within the upper layer 51.

Like the upper layer 51, drawing data files 57a to 57i and knowledge base files 58a to 58i which store inference information for each of elements 56a to 56i are provided separately for the respective elements 56a to 56i within the lower layer.

It is possible to construct tree-like hierarchical knowledge bases 8b by applying the concept of hierarchy to the elements of each layer. All the equipment and devices of a plant of interest are grouped by function to construct the hierarchical knowledge bases 8b of a hierarchical structure which reflect the functional construction of the plant so that the locations and contents of the hierarchical knowledge bases 8b become more understandable for an operator.

Moreover, a plurality of drawing data and inference information provided for the respective elements of the lower layer 55 included in a certain range are grouped into one in the upper layer 51 due to the hierarchical structure of the hierarchical knowledge bases 8b. Consequently, the hierarchical knowledge bases 8b of this Embodiment 1 differ from the knowledge base 8c which employs a conventional technique to directly take over a plurality of drawing data and inference information of a plurality of elements included in a certain range and to rearrange the data within the range.

A description is subsequently given of the operation of Embodiment 1 with reference to FIGS. 1, 2 and 3. When the process data of sampling n processed for inference by the process input/output unit 1, the data processing unit 2 and the inference processing interface 3 are input into the plant support system to begin inference processing, the processing of a fault detection inference is performed by the fault detection unit 4a (step 101). In this processing, input data from the inference processing interface 3 is compared with data indicating the states of the plant which are stored in the fault detection knowledge base 8a to infer whether a fault occurs in the plant. If the fault does not occur, inference on n-th sampling data is over and the step is proceeded to the processing of inference on n+1-th sampling data (NO in step 102, step 112). If the fault occurs, the fault detection unit 4a supplies the name of the fault (the name of a faulty phenomenon) and other data to the graphics processing unit 6A through the inference result processing unit 5, the graphics processing unit 6A produces image data from the supplied data, and sends the data to the CRT unit 19 through the man-machine interface 7, and the CRT unit 19 displays the data such as the name of the fault (YES in step 102, step 103).

Subsequently, the hierarchical knowledge management unit 10 selects an inference layer corresponding to the uppermost layer of the hierarchical knowledge base 8b (step 104). Then, the faulty equipment identifying unit 4b uses the hierarchical knowledge base 8b of the selected inference layer to carry out the processing of a faulty equipment identification inference (step 105). In this inference on the inference layer, only the knowledge base file of each element stored in the inference layer is used to infer and identify which element is faulty.

Further, the hierarchical knowledge management unit 10 investigates whether the lower layer 55 is provided for the faulty equipment (element) identified in the processing of the faulty equipment identification inference of step 105 (step 106). If the lower layer 55 is not provided, the knowledge base for a cause identification inference is used to make an inference for the identification of the cause (step 108). If the lower layer 55 is provided, the processing of a faulty equipment identification inference is performed on the lower layer 55 to identify a faulty equipment (step 107, step 105). The processing of inferences in these steps 105 to 107 is repeated until the lowest layer is reached.

Thereafter, the step is proceeded to the processing of a cause identification inference by the cause identifying unit 4c (step 108). In this processing, the hierarchical knowledge base 8b of the equipment identified as faulty is compared with input data from the inference processing interface 3, a description of the same contents as input data is retrieved from the hierarchical knowledge base 8b, and the branching of the retrieval tree is repeated to infer the written cause in the end. The final inference result is supplied to the graphics processing unit 6A through the inference result processing unit 5, the graphics processing unit 6A produces image data from the supplied data and send the image data to the CRT unit 19 through the man-machine interface 7, and the CRT unit 19 displays the cause of the fault (step 109).

The step is further proceeded to the processing of a counter-operation guidance deduction inference by the counter-operation deduction unit 4d (step 110). In this processing, a description of the same name as the name of the identified cause is retrieved from the hierarchical knowledge base 8b of the faulty equipment, and a description of a counter-operation to be taken against the cause is deduced from the hierarchical knowledge base 8b. The counter-operation guidance is sent to the inference result processing unit 5, the graphics processing unit 6A produces image data from the sent counter-operation guidance and sends the image data to the CRT unit 19 through the man-machine interface 7, and the CRT unit 19 displays the counter-operation against the fault (step 111).

In short, according to the inference processing of this Embodiment 1, a range of equipment identified as faulty is narrowed down by the processings of steps 105 to 107 of FIG. 3. Therefore, at the time of executing a faulty equipment identification inference, the inference is made from the upper layer 51 to gradually narrow down a range of equipment identified as faulty, but when the faulty equipment identification inference on the uppermost layer is over, a faulty site can be roughly identified.

In this Embodiment 1, the upper layer 51 has a smaller number of knowledge base files 54e to 54h which cover a wide range of inclusive information. Therefore, a faulty equipment can be roughly identified in a short period of time.

Moreover, in this Embodiment 1, in the process of carrying out an inference in stages from the upper layer 51, it is not necessary to infer the lower layers of elements other than an element identified as faulty because they have no connection with the fault, and, hence, a range of equipment having no connection with the fault can be excluded from the range to be inferred on in an early stage.

With reference to FIG. 2, when the fuel system 52g is identified as faulty by the faulty equipment identification inference on the upper layer 51, the control system 52a, the steam system 52b, the turbine system 52c, the condensate system 52e, the air system/exhaust system 52f, the combustion system 52d and the connection lines 52h are excluded from the inference execution file. Thereby, the lower layers of the control system 52a, the steam system 52b, the turbine system 52c, the condensate system 52e, the air system/exhaust system 52f, the combustion system 52d and the connection lines 52 are excluded from the inference execution file. Therefore, as the number of layers increases, a range of systems and equipment having no connection with a fault can be excluded from a range to be inferred on earlier.

Due to the described above, waste of time resulted by an inference to be made on all the inference information of a range of interest as in the prior art can be eliminated. Therefore, according to Embodiment 1, inference time is reduced with the result of improved inference efficiency. This effect becomes more marked as the number of layers of a plant of interest increases.

Further, in this Embodiment 1, when the processing of a faulty equipment identification inference in step 105 of FIG. 3 is performed up to the final layer, the processing of a cause identification inference is performed only on the equipment identified as faulty within the lowest layer in step 108. Therefore, the range of causes to be inferred is significantly narrowed down in the lowest layer, and, hence, the number of possible causes to be handled can be reduced, and the size of the knowledge base file for identifying the cause of the fault can be minimized. This leads to a reduction in data volume used in inference according to the division of systems and equipment into layers, compared with the prior art, whereby inference time can be reduced and inference efficiency can be enhanced.

Embodiment 2

Figure 4:
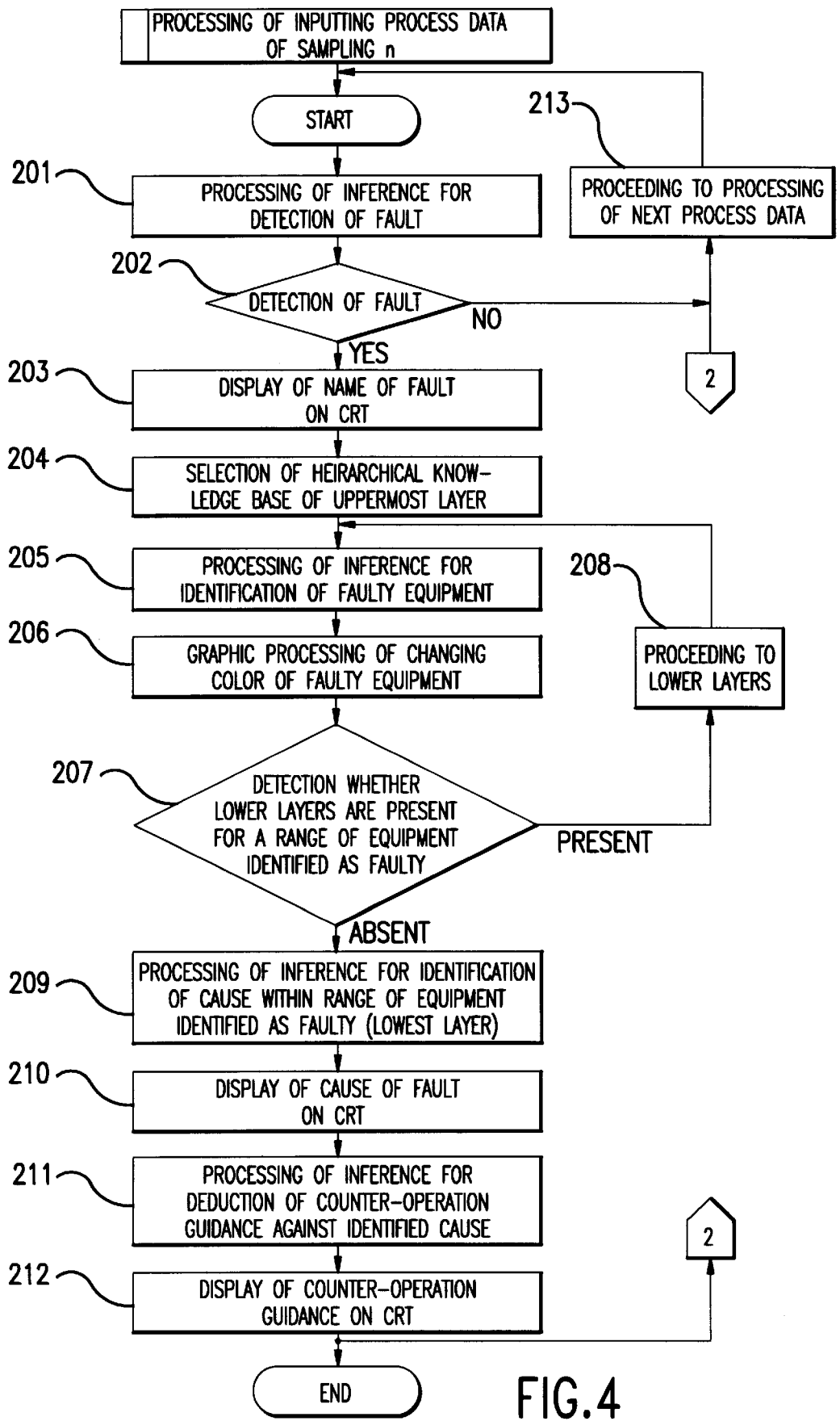
FIG. 4 is a flow chart of Embodiment 2 of the invention.

FIG. 4 is a flow chart showing the processing of inference according to Embodiment 2. This Embodiment 2 is characterized by adding a function to display the process of inference graphically on the screen to Embodiment 1. In concrete terms, this Embodiment 2 is achieved by adding the color change graphic processing of a faulty equipment shown in step 206 of the flow chart of FIG. 4 to the flow chart of FIG. 3 for Embodiment 1.

The color change graphic processing in step 206 is performed by the graphics processing unit 6A shown in FIG. 1. This color change graphic processing is to display a range of equipment and devices identified as faulty over the plant system diagram of the CRT unit 19 by changing their colors, flickering or zooming in when an inference for the identification of an faulty equipment is completed on each layer. Since an inference is made on each layer, the process of inference shifting from a wide range of equipment and devices to a small range is displayed on the CRT unit 19 by this color change graphic processing so that an operator can view the process of inference.

In short, according to this Embodiment 2, since the graphics processing unit 6A outputs the process of inference for the identification of a faulty equipment shifting in stages from the elements of upper layers to those of lower layers to the CRT unit 19 by changing colors, flickering or zooming in, a range of equipment and devices identified as faulty is narrowed down on the CRT unit 19 as the process of inference in a visible and understandable way for an operator. As a result, the operator can improve the reliability of the plant support system and the knowledge base 8A by referring to the process of inference and inference grounds on an on-line, real-time basis.

On the other hand, in the prior art, since only a faulty equipment is displayed on the CRT unit 19 as the result of an inference for the identification of a faulty equipment, the process of inference and the inference grounds cannot be understood by an operator, thus leading to a reduction in the reliability of the plant support system and the knowledge base 8.

Embodiment 3

Figure 5:
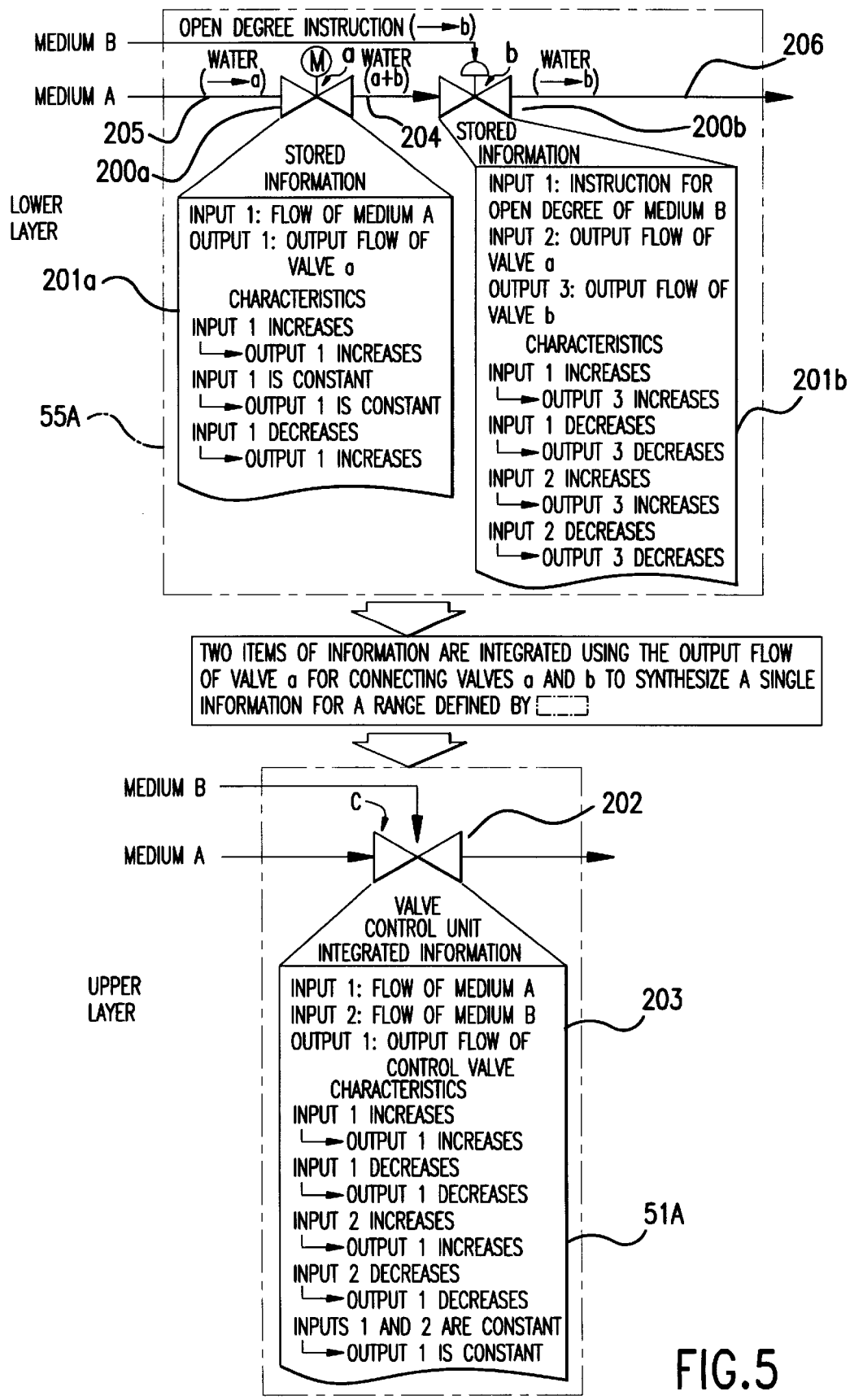
FIG. 5 is a diagram showing the concept of the creation of a knowledge base according to Embodiment 3 of the invention.
Figure 6:
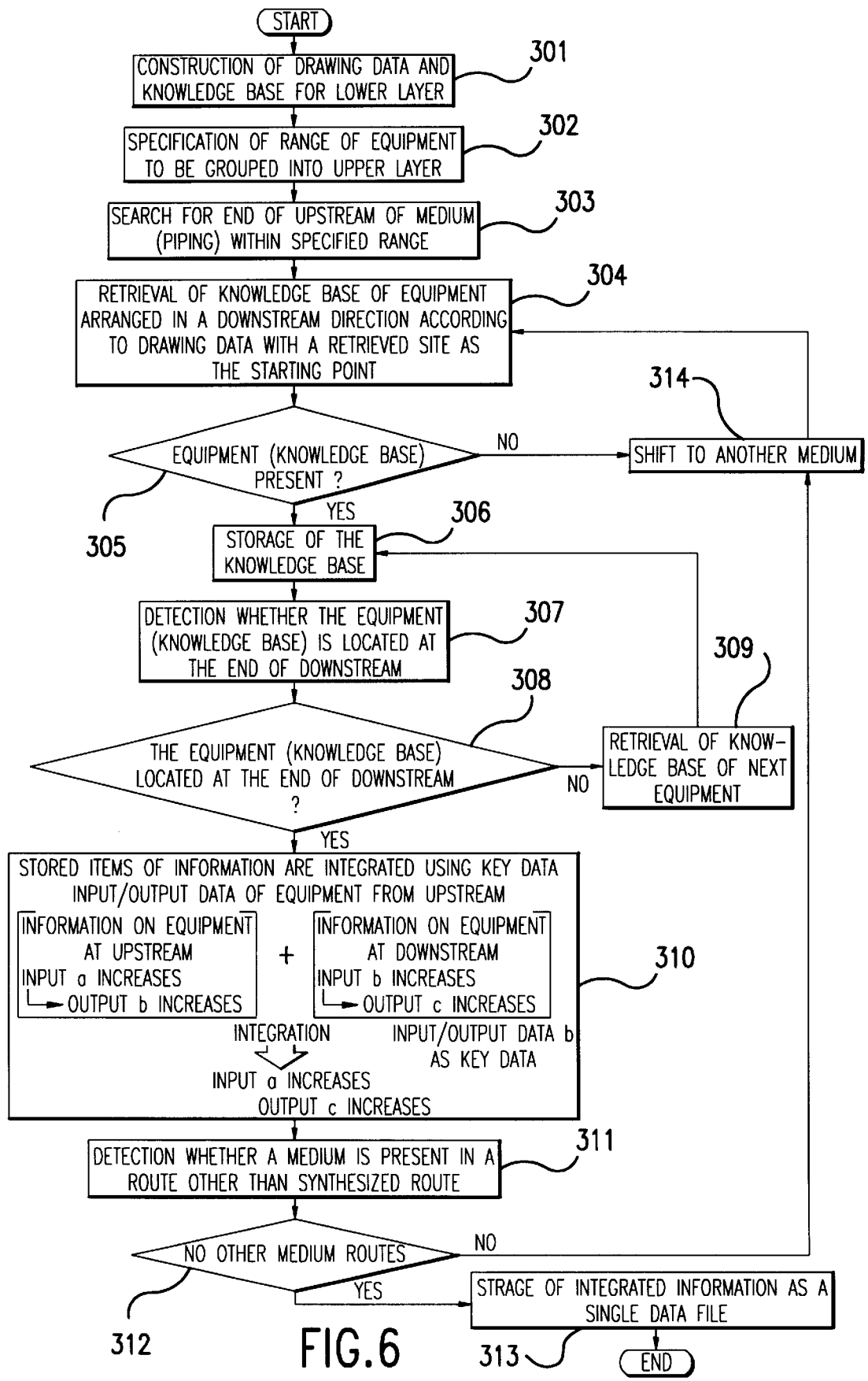
FIG. 6 is a flow chart of Embodiment 3 of the invention.

FIG. 5 is a diagram showing the concept of synthesizing a knowledge base according to Embodiment 3 and FIG. 6 is a flow chart showing the synthesis of a knowledge base. This Embodiment 3 is characterized by adding a function to synthesize and create hierarchical knowledge bases 8b to Embodiment 1. In concrete terms, this Embodiment 3 is an embodiment to which the processing of the knowledge base synthesis processing unit 11 shown in FIG. 1 is applied.

The concept of synthesizing a knowledge base of this Embodiment 3 is described with reference to FIG. 5. In FIG. 5, an unshown graphic tool or graphic editor is used to construct elements and inference information for the lower layer 55A. The upper layer 51A is created by grouping elements and inference information included in a specified and defined range of the lower layer 55A. As an example of this, in FIG. 5, drawing data 200a for a valve a and its knowledge base 201a and drawing data 200b for a valve b and its knowledge base 201b are taken. To specify these two valves a and b in the lower layer 55A as a range of elements and group them into a single element in the upper layer 51A, the drawing data 200a and 200b of these two valve elements a and b are integrated into drawing data 202 for a single flow control valve c, and two knowledge bases 201a and 201b are also integrated into a single knowledge base 203 for an element shown by drawing data 202 of the upper layer 51A using key data on a fluid (piping) 204 between these elements.

A description is subsequently given of the operation of this Embodiment 3 with reference to FIG. 6. In steps 301 and 302 of FIG. 6, the operator inputs the contents of processing in response to contents displayed on the CRT unit 19 using a keyboard or a mouse, the contents of processing are supplied to the operation unit 14 through the man-machine interface 7, and the operation unit 14 supplies the sent contents to the graphics processing unit 16 to display them on the screen of the CRT unit 19 as the contents of operation and also supplies the detailed contents of processing to the hierarchical knowledge management unit 10 and the knowledge base synthesis processing unit 11 so as to instruct the processing of synthesizing an actual knowledge base. The processings of steps 303 to 313 of FIG. 6 are performed by the knowledge base synthesis processing unit 11. Among the processings, retrieval of a knowledge base file and read/write operations are processed by the operation of hierarchical knowledge bases 8b by the knowledge base synthesis processing unit 11 through the hierarchical knowledge management unit 10.

In concrete terms, drawing data and a knowledge base on its elements are constructed as a lower layer (step 301). In this step 301, the unshown graphic tool or graphic editor is used to create a graphic system diagram including elements 205, 200a, 204, 200b and 206 of the lower layer 55A shown in FIG. 5 in a system diagram input screen displayed on the CRT unit 19. Data representing this created graphic system diagram are stored in the hierarchical knowledge bases 8b as drawing data. The knowledge bases 201a and 201b for the elements included in the graphic system diagram can be displayed on the CRT unit 19 by selecting with a mouse, and the contents of the knowledge bases 201a and 201b can be input and edited. At this time, information specifying routes such as the directions of fluid flows and the directions of signal flows as media of the connection lines 204, 205 and 206 is input into the knowledge bases 201a and 201b as information on connection lines such as pipings and wirings.

Thereafter, a range of elements in the lower layer to be classified into one group is specified (step 302). Icons (picture symbols) representing the elements 56a to 56i of FIG. 2 over the graphic system diagram displayed on the CRT unit 19 are selected one by one (by operating the mouse). Or, the range to be grouped as an upper layer is selected by specifying the range over the diagram (encircling with the mouse).

Information on the equipment of the specified range and the connections of media (piping system) connecting these equipment is retrieved so as to search for a medium positioned at the end of the upstream of the range (step 303). In other words, equipment and pipings within the range selected in step 302 are searched in the order of an equipment, piping (medium) and equipment in an upstream direction or a downstream direction along the flow of the fluid, using information specifying the connection relationships among equipment and routes of media such as pipings and wirings which is input in step 301, whereby the positional relationship between upstream and downstream is determined, and equipment are arranged from the upstream side, whereby, if there is no equipment at an upstream of a medium, the medium is determined to be located at the end of the upstream (same for a downstream). In this case, starting from the location of the searched medium, elements on a downstream side connected to the medium are searched (step 304).

Elements (such as equipment and pipings) are searched sequentially along the flow of the medium from its upstream, and the knowledge bases of the equipment are stored (steps 305 to 309). That is, search is performed in a downstream direction and, when a first element is selected, the knowledge base of the element is stored. Search is further continued in the downstream direction and the knowledge bases of the searched elements are stored until the end of the downstream is reached.

First two knowledge bases on the upstream side are selected from these stored knowledge bases and integrated into one (step 310). Integrating means is to offset output data of a knowledge base on the upstream side (characteristics of physical parameters on the way-out side of an equipment) by input data of a knowledge base on the downstream side (characteristics of physical parameters on the way-in side of an equipment) using key data on the characteristics of physical parameters such as temperature and pressure transmitted by media (piping system) for connecting elements of interest. This method is performed until the stored knowledge bases are integrated into one so as to synthesize a knowledge base. In the process of searching the location of the medium at the end of the upstream in step 303, when a branching route is formed in a piping, the branching point is taken as a starting point and the end of the downstream is the end point, whereas, when a confluence route is formed in the piping, the end of the upstream is taken as the starting point and the junction as the end point to repeat the processings of steps 304 to 310. In this way, the knowledge bases of all the equipment connected to one medium (a piping route) included in the specified range are integrated into one. When a plurality of media (piping systems) are present in the specified range, the same processings are performed on other media (piping systems) to synthesize a single knowledge base in the end (steps 311 to 314).

In short, in this Embodiment 3, the information of the lowest layer is constructed and the information of an upper layer is automatically created using a computer by specifying a range of elements to be included in the upper layer. Thereby, compared with the prior art in which knowledge bases are constructed and input one by one, time and labor required for the construction of a knowledge base can be significantly reduced according to this Embodiment 3.

Moreover, when the elements of the lowest layer are equipment of a general and standard type in terms of characteristics and operation contents, a knowledge base for the equipment stores simple contents. Therefore, knowledge bases for plants and equipment having different characteristics can be constructed using an already prepared standard knowledge base. This can overcome the problem with the prior art plant support system that it is difficult for people other than a specialist in the field of plant support system such as a knowledge engineer to construct knowledge bases.

Embodiment 4

Figure 7:
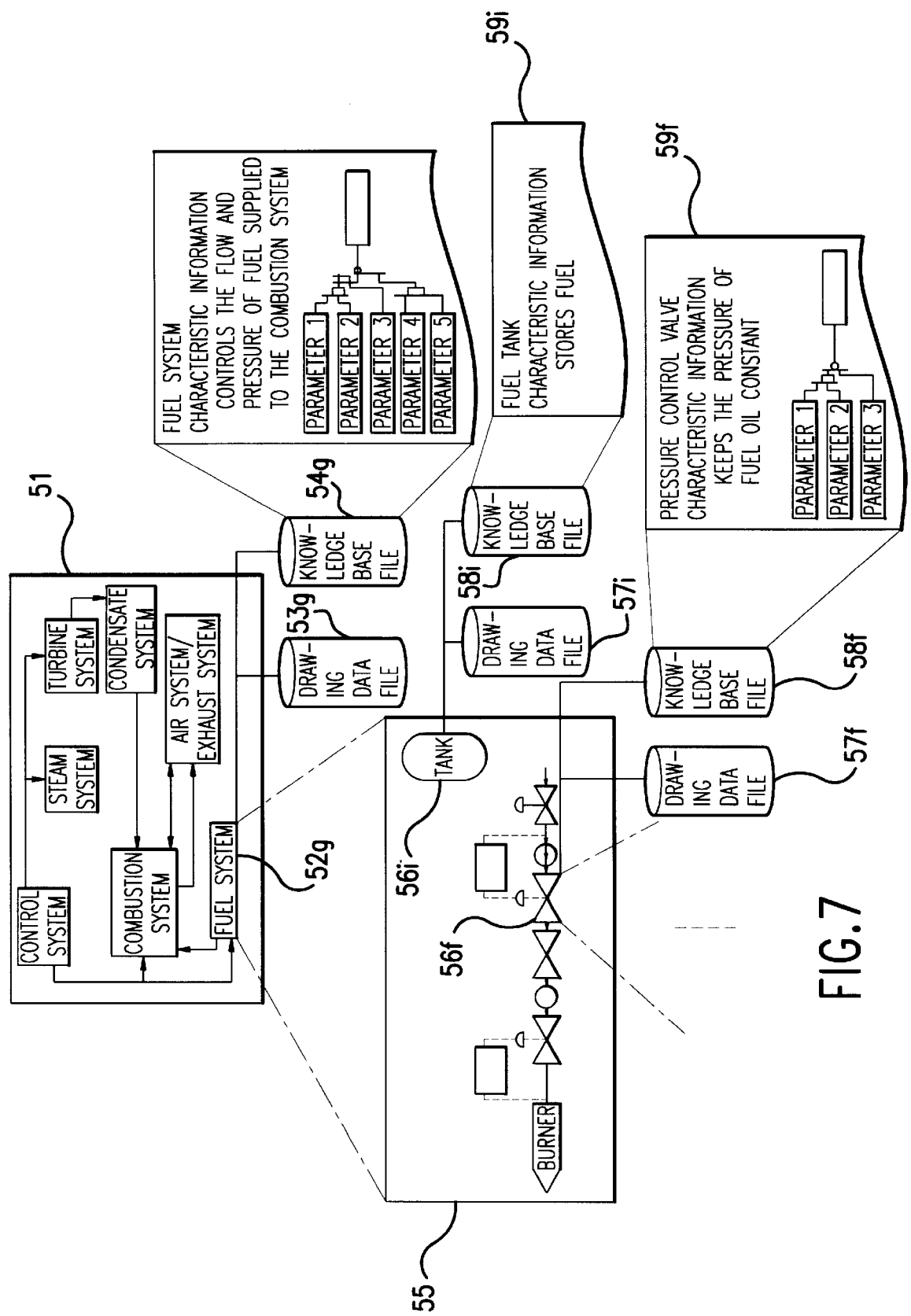
FIG. 7 is a diagram showing an example of information for each layer according to Embodiment 4 of the invention.

This Embodiment 4 is characterized by the display of the result of inference using the hierarchical knowledge bases 8b synthesized in the above-described Embodiment 3. FIG. 7 is a diagram showing an example of information of each layer of Embodiment 4.

As explained in the above-described Embodiment 3, a single knowledge base for elements of the upper layer 51 is created by integrating the information of the lower layer 55. When the knowledge base is used to display the result of inference, as evident from comparison between the contents 59g of the knowledge base of the fuel system 52g, an element of the upper layer 51 of FIG. 7, and the contents 59f of the knowledge base of the pressure control valve 56f, an element of the lower layer 55, the contents of the knowledge base of the upper layer 51 are information representing the characteristics of a plant system and more easy to understand intuitively. When a faulty equipment identification inference is performed, contents inferred in stages from the knowledge base of the upper layer 51 to the knowledge base of the lower layer 55 are output as inference grounds, backing the process of inference and evaluation on whether the inference is right can be performed immediately, thus enhancing the reliability of knowledge bases and system inferences.

Embodiment 5

Figure 8:
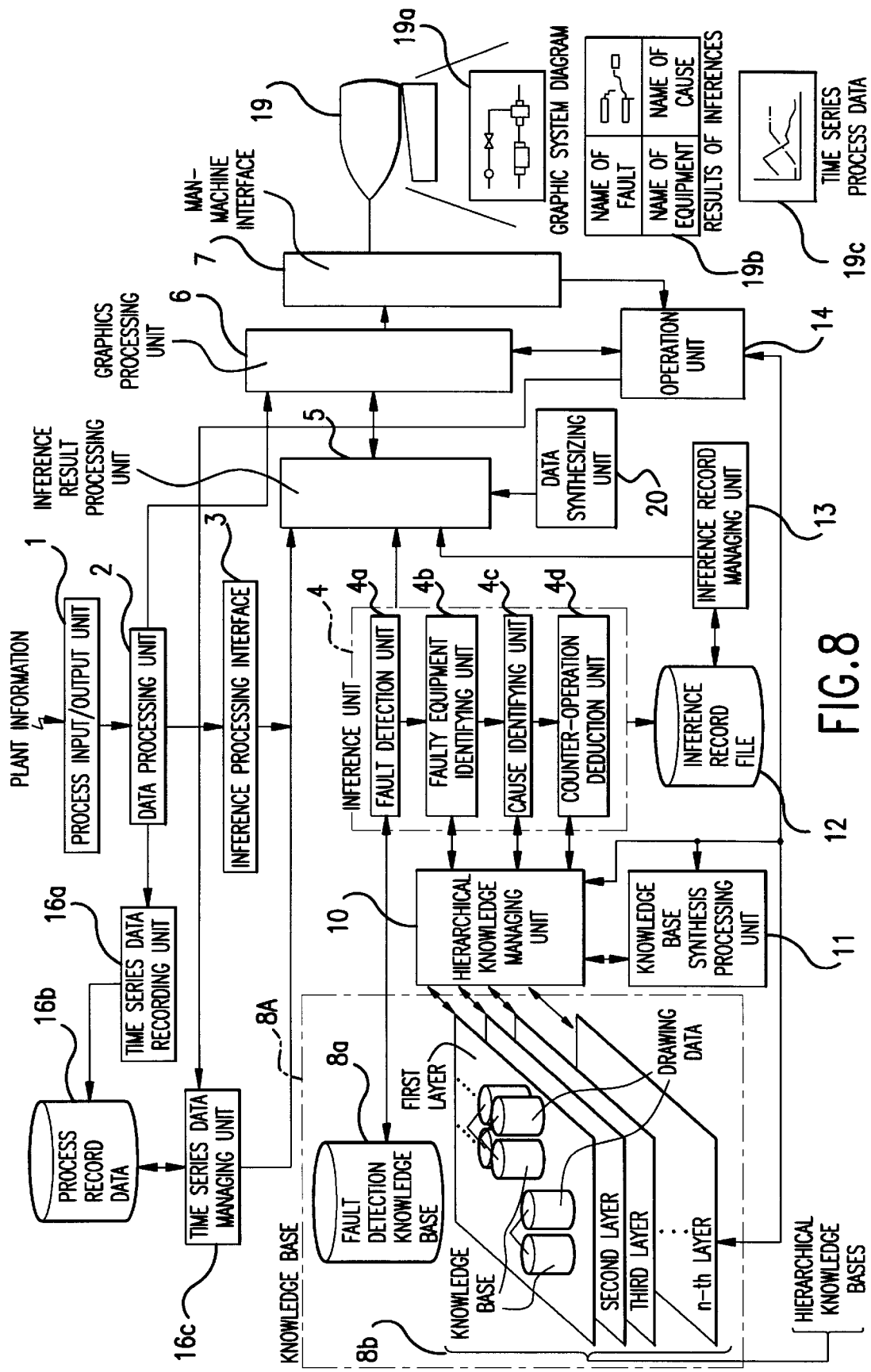
FIG. 8 is a structural diagram of a plant support system according to Embodiment 5 of the invention.

FIG. 8 is a structural diagram of a plant support system according to Embodiment 5. In FIG. 8, reference code 16a represents a time series data recording unit, 16b process recorded data, and 16c a time series data management unit.

According to this Embodiment 5, the time series data recording unit 16a records a process input value of the data processing unit 2 as the process recorded data 16b. When there is an instruction from the operation unit 14, the time series data management unit 16c retrieves required data at a requested time and duration from the process recorded data 16b and outputs the data to the inference result processing unit 5.

Thereby, unlike the prior art in which only a real-time current value is used in the processing of process data to display the result of inference or data, it is possible to compare with past data and to display trends of data for a certain period of time. As a result, according to this Embodiment 5, the analysis of a fault when it occurs is made easy with reference to related process data, thus making it possible to reduce labor and time required to handle the fault.

Embodiment 6

Figure 9:
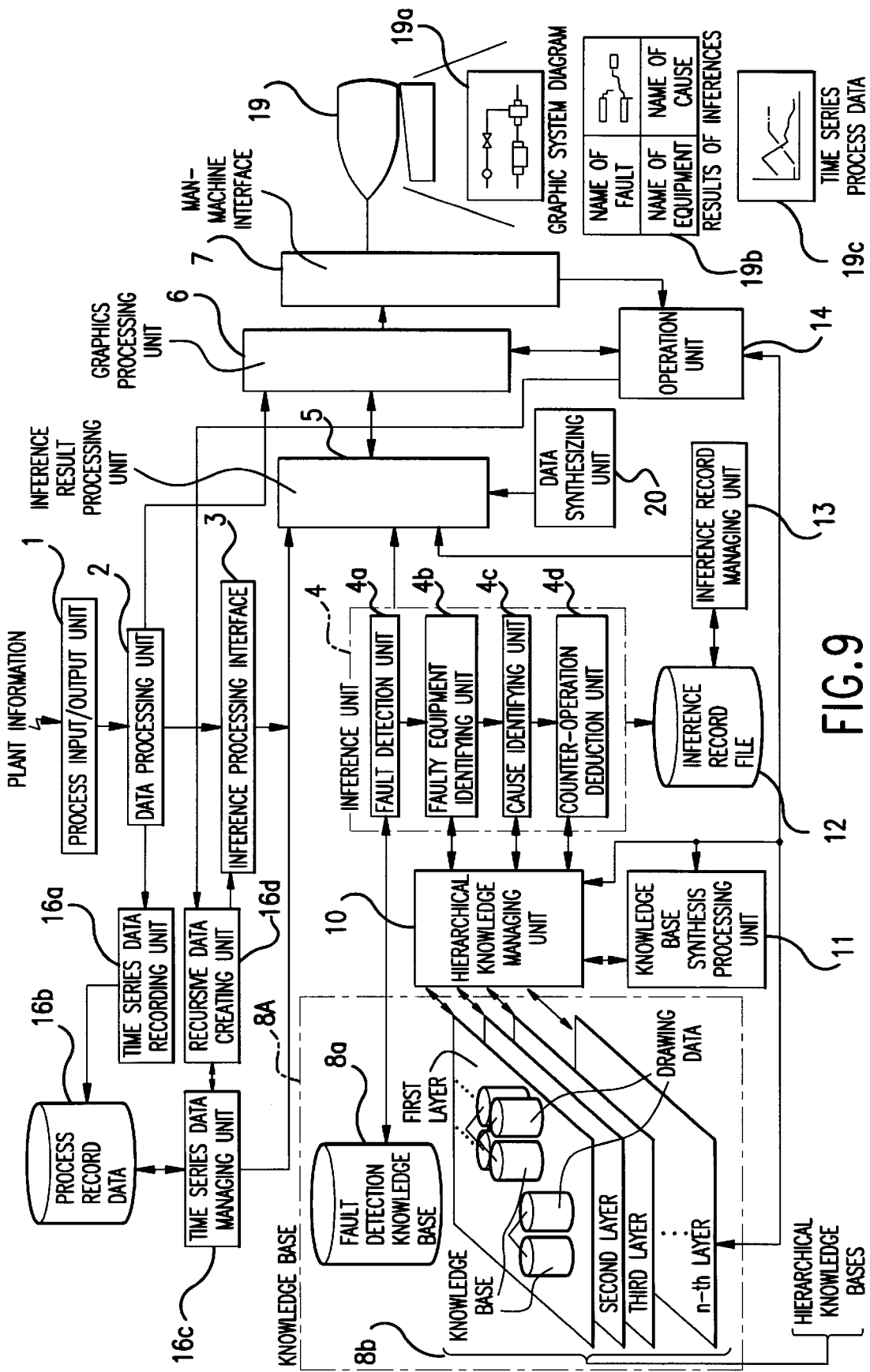
FIG. 9 is a structural diagram of a plant support system according to Embodiment 6 of the invention.

FIG. 9 is a structural diagram of a plant support system according to Embodiment 6. In FIG. 9, reference code 16d represents a recursive data creating unit. This recursive data creating unit 16d retrieves and collects data at a requested time and duration from the process recorded data 16b through the time series data management unit 16c, and performs the recursive processing of the data as the same sampling process data as data running on an on-line basis. The data subjected to the recursive processing by the recursive data creating unit 16d is supplied to the inference unit, by which a simulation inference using past data is made possible.

Thereby, it is possible to make an inference using data obtained at the time of a fault again, to repeat the analysis of a fault when it occurred and the confirmation of the processing of inference, to understand the contents of a fault, to verify the process of inference, and to learn about inference.

Moreover, it is possible to verify the hierarchical knowledge base 8b when it is modified. A high-quality knowledge base can be constructed by repeating verification using the process data of the plant.

Embodiment 7

Figure 10:
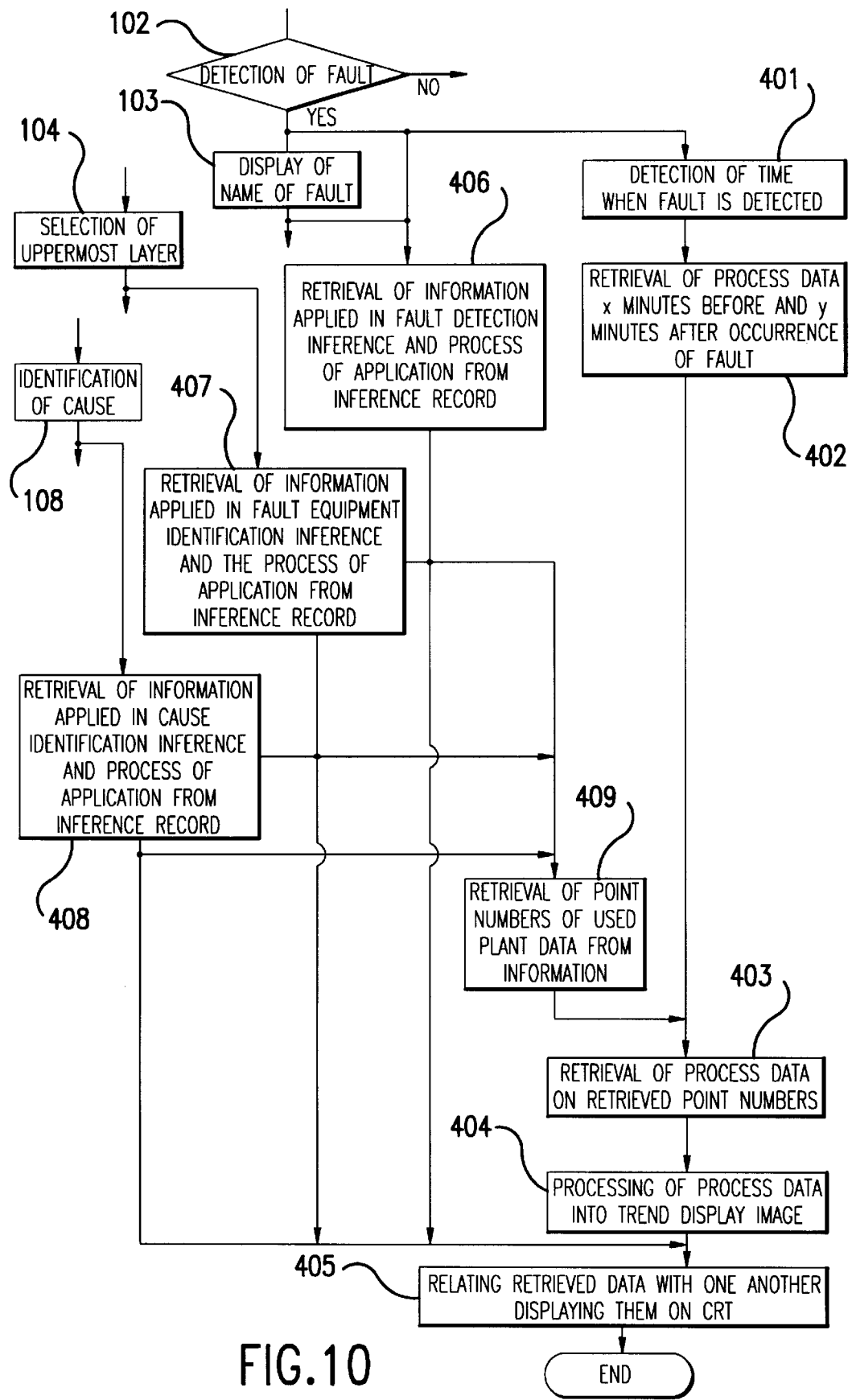
FIG. 10 is a flow chart of Embodiment 7 of the invention.

FIG. 10 is a flow chart showing the processing of inference according to Embodiment 7. The flow chart of FIG. 10 shows the processing of the results of inferences after the inferences shown in the flow chart of FIG. 3 are over, that is, the operation contents of the inference result processing unit 5 and the data synthesizing unit 20 shown in FIG. 1.

When a fault is detected in the course of inference processing, the name of the fault is output to the CRT unit 19 and a knowledge base applied in the fault detection inference is retrieved from the inference record file 12 (step 406). At the same time, the time when the fault is detected is detected (step 401), plant process data x minutes before the occurrence of the fault and y minutes after the occurrence of the fault with the time when the fault occurred taken as the starting point is retrieved (step 402).

When an inference for the identification of a faulty equipment is completed, the knowledge base applied in the faulty equipment identification inference is retrieved from the inference record file 12 (step 407).

Further, when an inference for the identification of the cause of the fault is completed, a knowledge base applied in the cause identification inference is retrieved from the inference record file 12 (step 408).

Point numbers of the plant process data used in the retrieved knowledge bases applied in the respective inferences are retrieved as key data (step 409) and the plant process data during the time x+y is retrieved (step 403). The retrieved data is processed into a trend display image (step 404), and output to the CRT unit 19 together with information applied in the respective inferences (step 405).

Thereby, it is possible to check data relating to a fault when it occurs and the process of inference using the data on the screen, reduce the operator's load under the state of emergency that a fault occurs, and confirm and understand the contents of the fault with ease.

Embodiment 8

Figure 11:
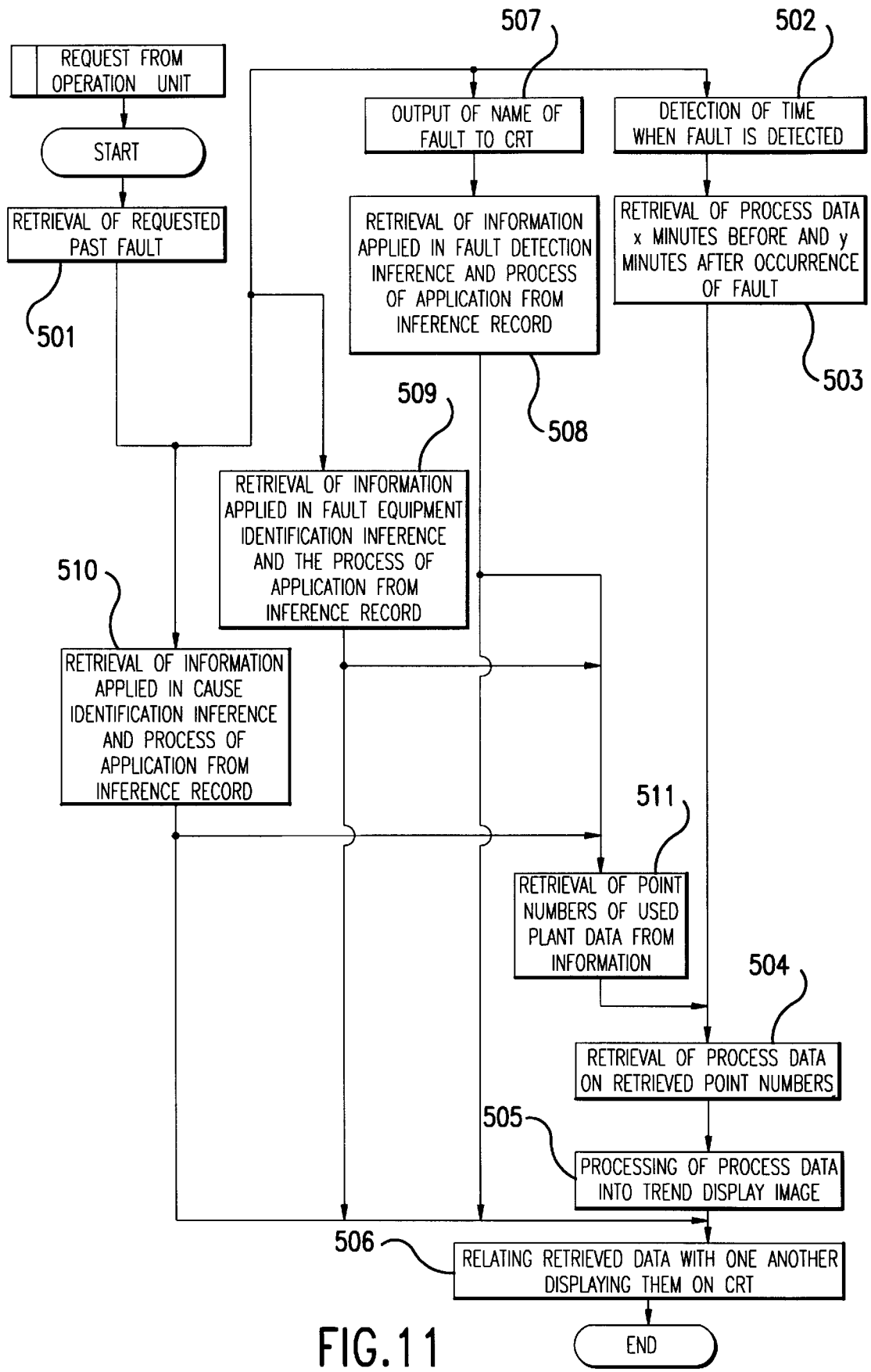
FIG. 11 is a flow chart of Embodiment 8 of the invention.

FIG. 11 is a flow chart showing the processing of inference according to Embodiment 8. In FIG. 11, the results of inferences of the above-described Embodiment 7 can be processed upon a request from the operator.

In this Embodiment 8, as shown in FIG. 11, it is possible to display the hierarchical knowledge bases 8b applied in inferences at the time when a fault occurred in the past and a trend image for the data used in the inferences on the CRT unit 19 using key data on the name of the fault that occurred in the past according to a request from the operation unit 14.

Thereby, it is possible to confirm and check the contents of a fault when it occurred in the past, and utilize the contents in the analysis of the state of a fault, the learning of the state of a fault and the verification of a knowledge base.

As described on the foregoing pages, according to the first aspect of the invention, since hierarchical knowledge bases are constructed by grouping equipment and devices of a plant of interest by function, knowledge base files reflect the functional construction of the plant so that the location and contents of the knowledge bases are understandable for the operator.

According to the second aspect of the invention, since an inference is made from the uppermost layer to narrow down a range of equipment identified as faulty, a faulty site can be roughly identified at the time when an inference for the identification of a faulty equipment on the uppermost layer is over.

The number of knowledge base files is smaller and a wider range of information is stored in upper layers. Thereby, it is possible to roughly identify a faulty equipment in the shortest period of time.

Further, since elements of lower layers other than those identified as faulty in the process of inference in stages from upper layers have no connection with a fault, the inference does not need to be made on these elements. Therefore, it is possible to exclude in an early stage a range of equipment and devices having no connection with the fault from a range on which the inference is to be made. Thereby, waste of time and labor required to apply knowledge bases in inferences when an inference is made on all the knowledge bases of the elements of interest as in the case where an inference is made on the lowest layer can be eliminated with the result of a reduction in inference time, thus improving inference efficiency. This effect is more marked in a large plant as the number of layers increases.

According to the third aspect of the invention, since the process of narrowing down a range of elements identified as faulty in stages from upper layers to lower layers by an inference for the identification of a faulty equipment can be displayed by zooming in, changing the color of, or flickering the faulty equipment by the graphics processing unit, the process of inference can be output to an output device such as a CRT unit in a visible and comprehensive way by narrowing down a range of faulty equipment. Therefore, with reference to the process of inference and inference grounds on an on-line, real-time basis, the operator can easily understand the contents of a fault when it occurs. In addition, the reliability of the system and knowledge bases can be enhanced.

According to the fourth aspect of the invention, since information of upper layers is created from information of lower layers, time and labor required for the construction of knowledge bases can be significantly reduced compared with the prior art in which knowledge bases are constructed and input one by one.

According to the fifth aspect of the invention, since contents inferred in stages from the knowledge bases of upper layers to the knowledge bases of lower layers are output as inference grounds when an inference for the identification of a faulty equipment is executed, backing the process of inference and evaluation on whether the inference is right can be performed immediately, thus enhancing the reliability of knowledge bases and system inference.

According to the sixth aspect of the invention, since process data are sampled and stored in the time serial order, the analysis of a fault when it occurred is made easy with reference to related process data, thus reducing time and labor required to handle a fault when it occurs.

According to the seventh aspect of the invention, since an inference using data at the time of a fault is made again, the analysis of a fault when it occurred and the confirmation of the processing of inference can be repeated, thus making it possible to understand the contents of the fault, verify the process of inference and learn about inference.

Moreover, since it is possible to verify a modified knowledge base, a high-quality knowledge base can be constructed by repeating verification using the process data of a plant.

According to the eighth aspect of the invention, since data relating to a fault when it occurs and the process of inference using the data are displayed, the operator's load under the state of emergency that a fault occurs can be reduced and the contents of the fault can be confirmed and understood with ease.

According to the ninth aspect of the invention, since the contents of a past fault when it occurred and inference data are related with each other and displayed, the data can be used to analyze the state of a fault, learn about the state of a fault and verify knowledge bases.

What is claimed is:

1. An inference generating plant support system, comprising:
   detection means for detecting a fault in a plant by comparing plant information inputted by the plant with data stored in a fault detection knowledge base representing normal states of the plant and for outputting information identifying the detected fault;
   a plurality of hierarchical knowledge bases having a hierarchical structure dividing a plant system into a plurality of layers arranged hierarchically from an uppermost layer to a lowermost layer for the identification of faulty equipment, said layers storing information on states of plant equipment and devices; media flowing through the plant, control instructions used in the plant, and a plant system diagram;
   a hierarchical knowledge management unit for managing said hierarchical knowledge bases and for identifying faulty equipment by sequentially carrying out faulty equipment identification inference processing using said detected fault information in conjunction with said plurality of hierarchical layers, from an uppermost layer to a lowermost layer provided for faulty equipment identified in an upper layer; and
   display means for displaying the results of inferences made in detecting faults and identifying faulty equipment of said plant.

2. A plant support system according to claim 1, which further comprises a graphics processing unit for displaying the process of inference that narrows down a range of faulty equipment over the displayed system diagram by changing colors or flickering.

3. An inference generating plant support system, comprising:
   detection means for detecting a fault in a plant by comparing plant information inputted by the plant with data stored in a fault detection knowledge base representing normal states of the plant and for outputting information identifying the detected fault;
   a plurality of hierarchical knowledge bases having a hierarchical structure dividing a plant system into a plurality of layers arranged hierarchically from an uppermost layer to a lowermost layer for the identification of faulty equipment, said layers storing information on states of plant equipment and devices, media flowing through the plant, control instructions used in the plant, and a plant system diagram;
   a knowledge base synthesis processing unit for creating a knowledge base of an upper layer from a knowledge base of a lower layer by integrating information to construct hierarchical knowledge bases for identification of faulty equipment using said plant system diagram; and
   display means for displaying the results of inferences made in detecting faults and identifying faulty equipment of said plant.

4. A plant support system according to claim 3, which further comprises means of presenting the synthesized knowledge base of the upper layer which stores a wide range of information as a ground for inference.

5. An inference generating plant support system, comprising:
   detection means for detecting a fault in a plant by comparing plant information inputted by the plant with data stored in a fault detection knowledge base representing normal states of the plant and for outputting information identifying the detected fault;

a plurality of hierarchical knowledge bases having a hierarchical structure dividing a plant system into a plurality of layers arranged hierarchically from an uppermost layer to a lowermost layer for the identification of faulty equipment, said layers storing information on states of plant equipment and devices, media flowing through the plant, control instructions used in the plant, and a plant system diagram;

display means for displaying the results of inferences made in detecting faults and identifying faulty equipment of said plant;

storage and management means for storing and managing collected plant process data; and processing means for processing said collected plant process data into time series data.

6. A plant support system according to claim 5, which further comprises means of performing recursive processing on collected plant process recorded data and making an inference using the recursive data.

7. An inference generating plant support system, comprising:

detection means for detecting a fault in a plant by comparing plant information inputted by the plant with data stored in a fault detection knowledge base representing normal states of the plant and for outputting information identifying the detected fault;

a plurality of hierarchical knowledge bases having a hierarchical structure dividing a plant system into a plurality of layers arranged hierarchically from an uppermost layer to a lowermost layer for the identification of faulty equipment, said layers storing information on states of plant equipment and devices, media flowing through the plant, control instructions used in the plant, and a plant system diagram;

display means for displaying the results of inferences made in detecting faults and identifying faulty equipment of said plant; and means for presenting an inference record, data relating to inferences from data before and after occurrence of detected faults, and trends when inferences are made on layers when said detected faults occur.

8. A plant support system according to claim 7, which further comprises means for relating the results of inferences upon request and, when a fault has occurred, with the inference record and inference data on the occurrence of the fault.

* * * * *